United States Patent [19]
Zylka et al.

[11] 4,292,180
[45] Sep. 29, 1981

[54] MILK FILTER SOCK

[75] Inventors: Kenneth R. Zylka, Grafton; Earl R. Witte, Richfield, both of Wis.

[73] Assignee: Meridian Industries Inc., Milwaukee, Wis.

[21] Appl. No.: 135,226

[22] Filed: Mar. 31, 1980

[51] Int. Cl.³ .............................................. B01D 29/30
[52] U.S. Cl. ................................ 210/496; 210/497.01
[58] Field of Search ................. 55/379, 382, 524, 528; 210/323 T, 483, 496, 497 R, 497 FB, 323.2, 497.01, 497.2

[56] References Cited

U.S. PATENT DOCUMENTS 4,141,128  2/1979  Wonderling ........................... 55/379
4,164,400  8/1979  Wald ..................................... 55/524

FOREIGN PATENT DOCUMENTS 582536  12/1976  Switzerland ........................... 55/382

OTHER PUBLICATIONS

"New Concepts in Ultrasonic Sealing", *Modern Plastics*, Mar. 1964, pp. 125–129.

*Primary Examiner*—Ivars C. Cintins
*Attorney, Agent, or Firm*—Andrus, Sceales, Starke & Sawall

[57] ABSTRACT

A milk filter sock composed of a folded sheet of spun bonded, randomly oriented, continuous, synthetic fibers. The longitudinal edges of the sheet are joined together by an ultrasonic bond, and one pair of end edges of the folded sheet are also joined by an ultrasonic bond to form an open-end tubular sock. The spun bonded fibrous material provides increased strength for the sock and more uniform filtering characteristics. In addition, the filter sock has less weight and bulk than prior art filter socks.

2 Claims, 3 Drawing Figures

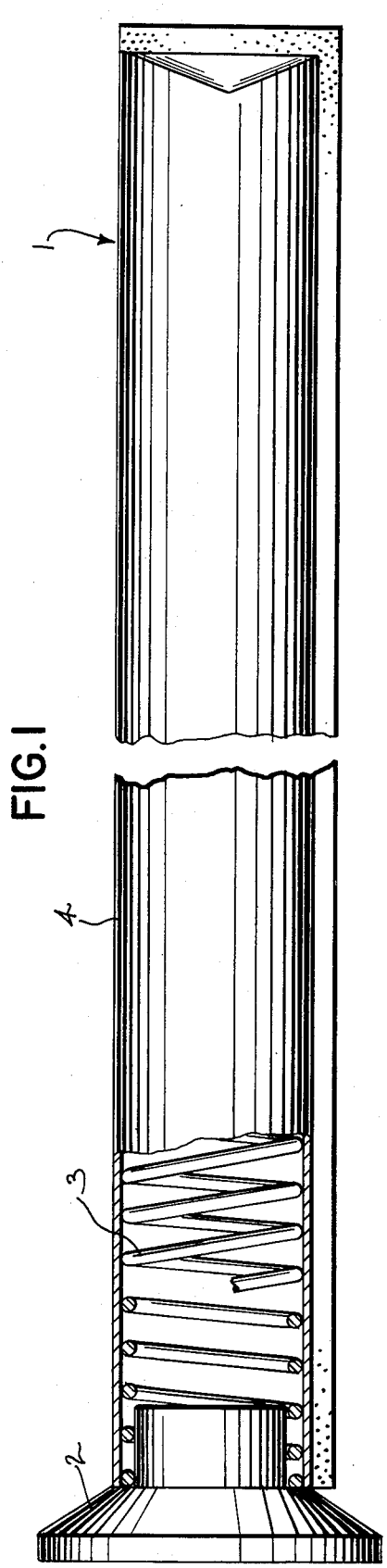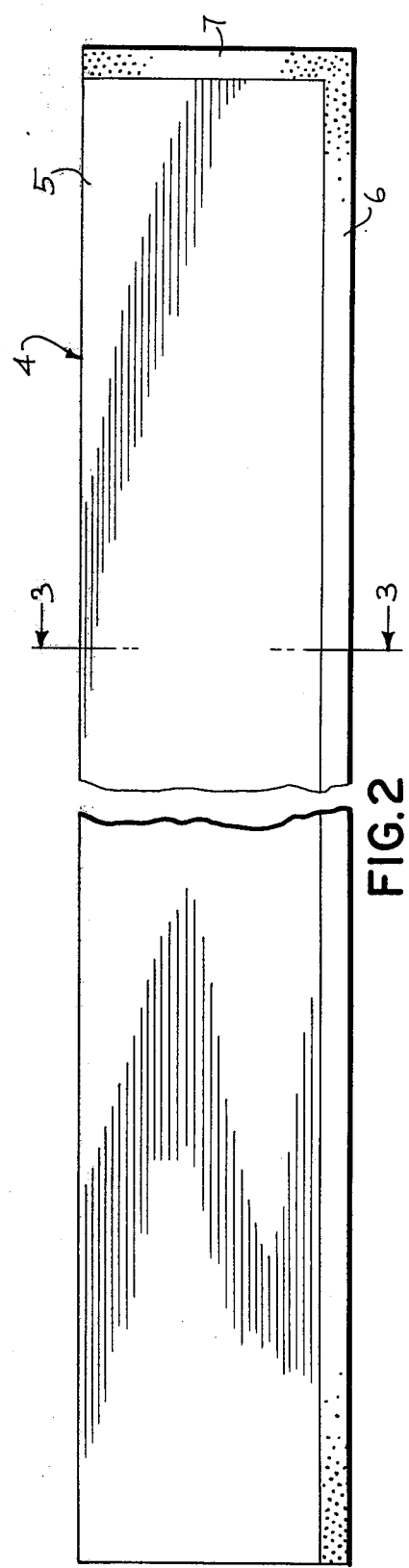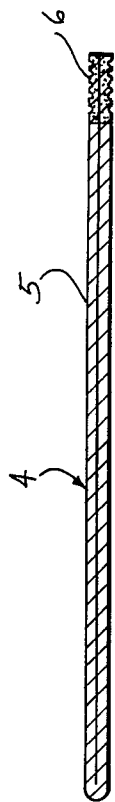

MILK FILTER SOCK

BACKGROUND OF THE INVENTION

Milk filter socks are used as in-line filters in pipeline milk systems. In general, the filter includes a tubular fabric sock which is mounted around a helical support that is attached at one end to a gasket.

In the past, the filter socks have been formed of a sheet of rayon which is folded longitudinally, and the longitudinal edges and a pair of adjacent end edges are hand sewn to provide the tubular sock. More recently, filter socks have been constructed utilizing a hot melt adhesive to joint the longitudinal and end edges of the rayon material.

The filter socks, as used in the past, lacked strength and had considerable bulk. In addition, prior filter socks did not, in all cases, have uniform filtering characteristics, nor did they have uniform cross-sectional areas which made the socks difficult to install on the gasket.

SUMMARY OF THE INVENTION

The invention relates to an improved milk filter sock for use in a pipeline milking system. According to the invention, the filter sock is composed of a longitudinally folded sheet of spun bonded, randomly oriented, continuous, synthetic fibers, such as polyester fibers. The free longitudinal edges of the sheet are joined together by an ultrasonic bond and similarly, a pair of adjacent end or transverse edges are joined by a second ultrasonic bond to provide a tubular structure having an open end.

The use of the spun bonded, synthetic material provides the sock with substantially greater strength than rayon socks, as used in the past, and the spun bonded material provides more uniform filter characteristics over the length of the sock because the fabric is less vulnerable to thick and thin spots. As a further advantage, the spun bonded material has a relatively smooth surface which enables the sock to be readily installed on the gasket without the necessity of moistening the sock.

The ultrasonic bond results in the fusion of the adjacent edges of the spun bonded sheet, providing a more effective bond and resulting in greater strength in the sock. As a further advantage, the ultrasonic bond reduces the bulk of the sock, enabling a greater number of socks to be packed in a given size box or container.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation with parts broken away showing a milk filter incorporating the filter sock of the invention;

FIG. 2 is a plan view of the sock before installation in the filter; and

FIG. 3 is a section taken along line 3—3 of FIG. 2.

DESCRIPTION OF THE PREFERRED EMBODIMENT

FIG. 1 illustrates a milk filter 1 as used in a pipeline milking system which comprises an annular resilient gasket 2 that carries a helical wire support 3. An open-end, fibrous, filter sock 4 is secured around the gasket and is maintained in the open condition by the support 3.

The construction of the sock 4 is best illustrated in FIGS. 2 and 3. The sock is composed of a longitudinally folded sheet 5 of spun bonded, randomly oriented, continuous, synthetic fibers, such as polyester fibers. The free longitudinal edges of the sheet are bonded together by an ultrasonic bond 6, while the adjacent end edges are bonded by a transverse ultrasonic bond 7 to provide the open end tubular construction.

The randomly oriented fibers in the spun bonded sheet 5 are fused at points of crossover so that the sheet does not contain binders or adhesives. To provide the desired filter characteristics for the sock, the sheet 5 has a weight in the range of 1.5 to 4.0 ounces per square yard.

The bonds 6 and 7 are formed by ultrasonic welding utilizing a knurled anvil, so that the fibers in the bonded areas are fused together and the knurled anvil provides the bonded areas with a series of alternate depressions and projections, thereby increasing the surface area to thereby enhance the bond between the edges of the sheet.

The spun bonded material 5, due to the continuous and randomly oriented nature of the fibers, provides improved strength for the sock so that it will not rip or tear when being installed or removed. The spun bonded material also provides more uniform filter characteristics for the sheet, for the density is substantially constant throughout the entire area of the sheet.

The use of the ultrasonic bonds, which can be precisely applied to the sheet, results in a more uniform internal cross-section which enables the sock to be more readily installed on the gasket. In addition, the ultrasonic bonds achieve a bulk reduction, in the order of about 75%, enabling a greater number of socks to be packaged in a given size box or container.

The physical characteristics of the polyester fibers provides the sock with a relatively smooth surface to enable the sock to be more readily installed on the gasket without the necessity of moistening the fibrous material.

Various modes of carrying out the invention are contemplated as being within the scope of the following claims particularly pointing out and distinctly claiming the subject matter which is regarded as the invention.

We claim:

1. An open-ended filter sock for filtering milk, comprising a longitudinally folded sheet of randomly oriented spun bonded synthetic fibers, said sheet having a pair of overlying sheet sections and having a weight in the range of 1.5 to 4.0 ounces per square yard, a first ultrasonic weld joining the adjacent longitudinal edges of the sheet sections, and a second ultrasonic weld joining a pair of adjacent end edges of said sheet sections to provide a tubular open-ended sock, said ultrasonic welds comprising a series of alternating depressions and projections to thereby increase the strength of the welded area.

2. The filter sock of claim 1, wherein the fibrous material is polyester.

* * * * *